UNITED STATES PATENT OFFICE.

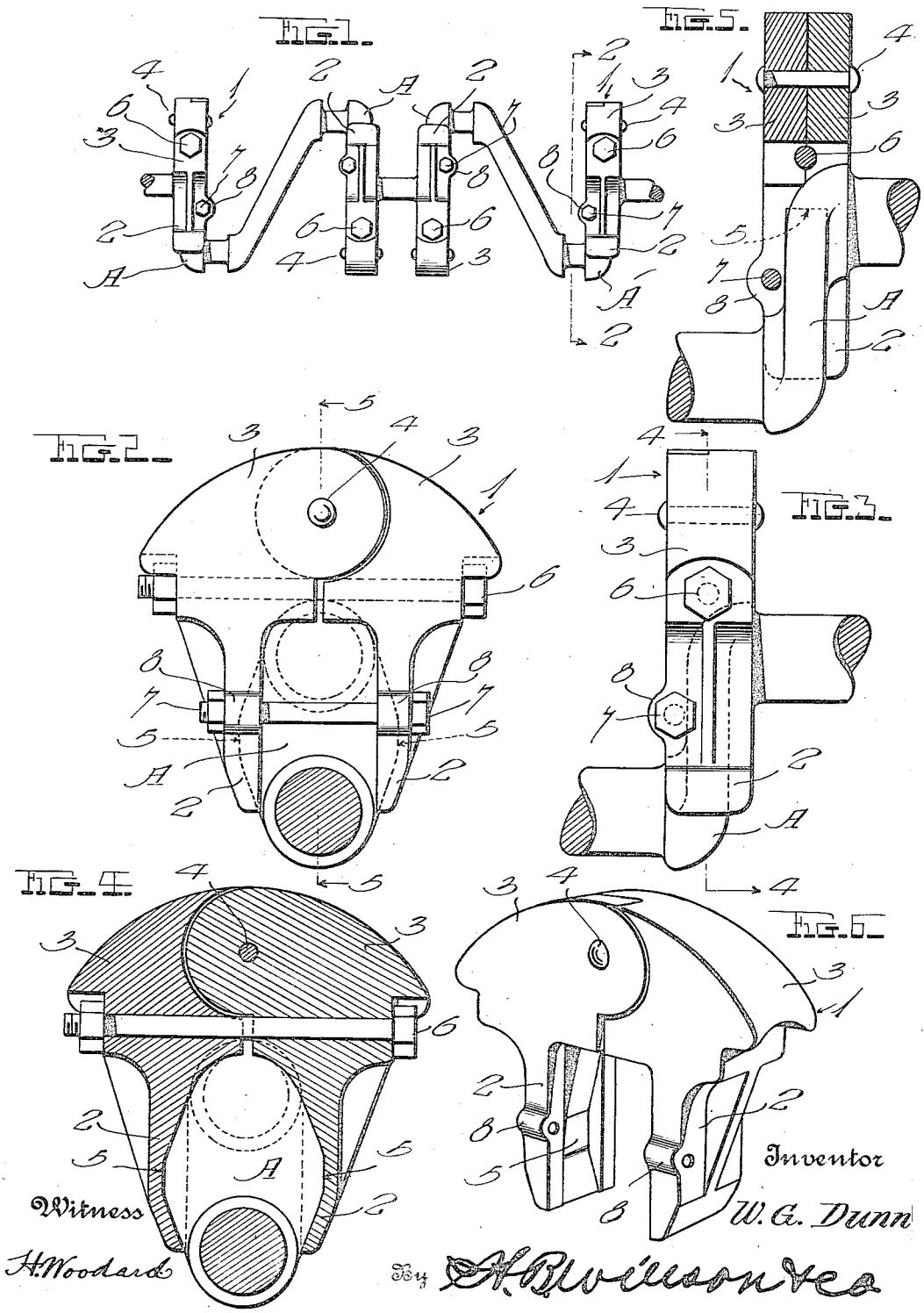

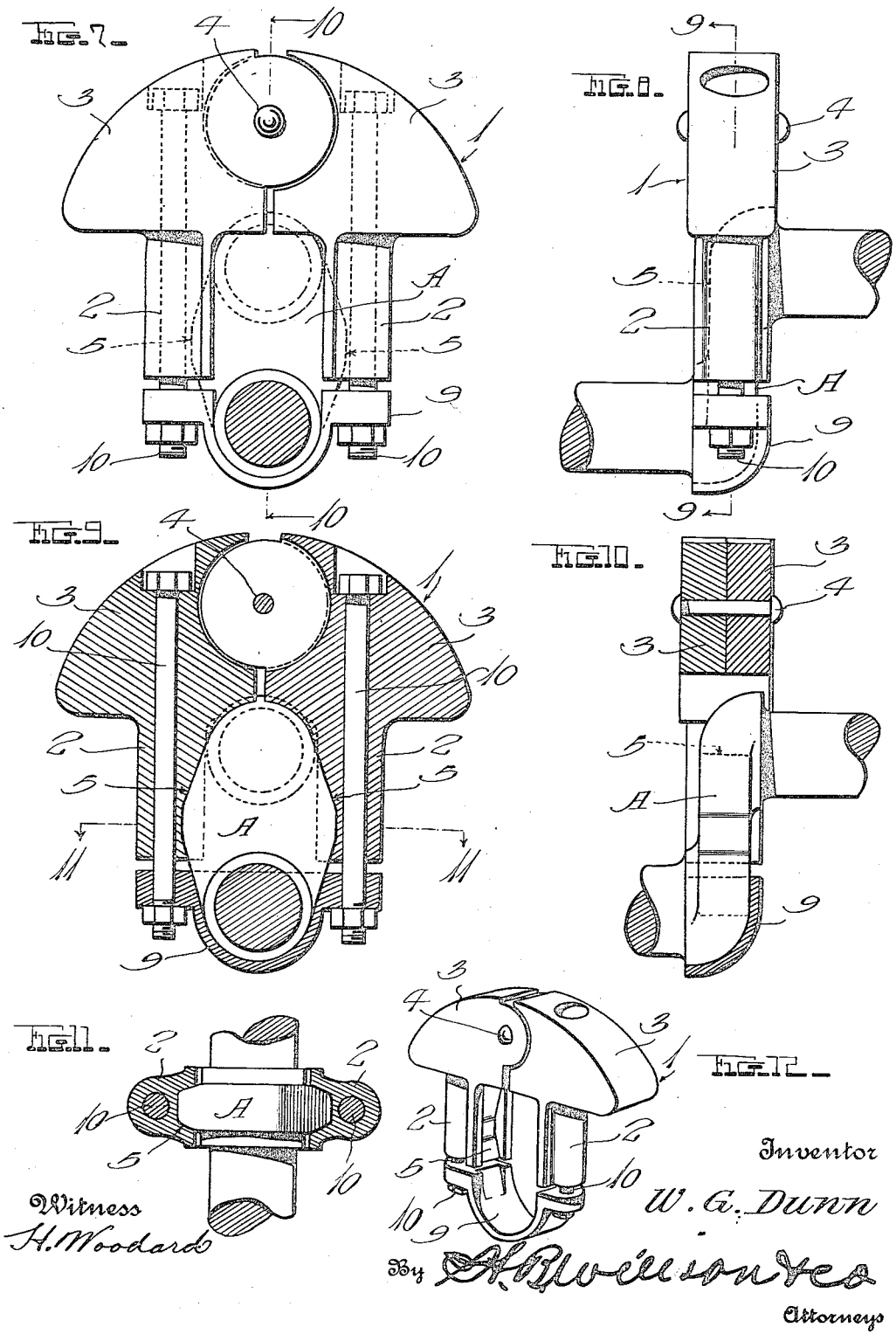

WILLIAM G. DUNN, OF CLARINDA, IOWA.

CRANK-SHAFT COUNTERBALANCE.

1,259,086.

Specification of Letters Patent.  Patented Mar. 12, 1918.

Application filed December 17, 1917. Serial No. 207,555.

*To all whom it may concern:*

Be it known that I, WILLIAM G. DUNN, a citizen of the United States, residing at Clarinda, in the county of Page and State of Iowa, have invented certain new and useful Improvements in Crank-Shaft Counterbalances; and I do declare the following to be a full, clear, and exact description of the invention, such as will enable others skilled in the art to which it appertains to make and use the same.

My invention relates to improvements in counterbalances of a type designed principally for use upon the crank shafts of internal combustion engines, the principal object being to provide a simple and inexpensive, yet a highly efficient counterbalance which may be applied to the shaft without the necessity of removing the latter from the crank case.

With the foregoing general object in view, the invention resides in the novel features of construction and unique combinations of parts to be hereinafter fully described and claimed, the descriptive matter being supplemented by the accompanying drawings which form a part of this specification and in which:

Figure 1 is a side elevation of a crank shaft equipped with the invention;

Fig. 2 is a transverse section of the shaft on the plane of the line 2—2 of Fig. 1, showing a side elevation of one of the counterbalances;

Fig. 3 is an edge view of Fig. 2;

Fig. 4 is a vertical section on the plane of the line 4—4 of Fig. 3;

Fig. 5 is a vertical section on the plane indicated by the line 5—5 of Fig. 2;

Fig. 6 is a perspective view of the form of counterbalance shown in Figs. 1 to 5;

Fig. 7 is a view similar to Fig. 2 but showing a different form of the invention;

Fig. 8 is an edge view of Fig. 7;

Fig. 9 is a vertical section on the plane of the line 9—9 of Fig. 8;

Fig. 10 is a sectional view on the plane of the line 10—10 of Fig. 7;

Fig. 11 is a detail horizontal section on the plane of the line 11—11 of Fig. 9; and Fig. 12 is a perspective view of the counterbalance shown in Figs. 7 to 11.

In the drawings above briefly described, the numeral 1 designates a counterbalancing weight adapted to be positioned at one end of an engine shaft crank arm such as those indicated at A in the drawings, said weight having a pair of parallel arms 2 extending therefrom in the same direction and adapted to straddle and grip the arm A, the construction being such as to permit the arms 2 to move toward and away from each other for easy application and removal, this result being preferably obtained by forming the weight 1 of two sections 3 hinged together at 4, each section rigidly carrying one of said arms as shown in the several views.

In both forms of the invention illustrated in the drawings, the inner sides of the arms 2 are formed with seats 5 to receive the edges of the crank arm A, said seats comprising longitudinal channels formed in said arms and decreasing in depth toward their ends for snug engagement with the arms A which latter are usually of greater width at their central portion than at their ends. Numerous means may be employed for preventing spreading of the arms 2 after application thereof to the crank arms A. Figs. 1 to 6 illustrate a bolt 6 below the hinge 4 for drawing the two sections of the weight 1 toward each other, and a second bolt 7 passing through apertured ears 8 formed on one edge of the arms 2. Figs. 7 to 12, however, illustrate a U-shaped cap 9 engaging the end of the crank arm A opposite the weight 1, and bolts 10 passing through the sections 3 of the weight, through the arm 2, and through the projecting ends of said cap. Either method of construction will produce the required results and in fact such results could well be obtained in a number of other ways. The invention is not therefore limited to such details.

In applying the device to the crank shaft, the arrangement shown in Fig. 1 is employed and it will be clear that all of the counterbalances may be applied without the necessity of removing the crank shaft from the crank case, due to the fact that the arms 2 may be spread to straddle the crank arms A and then moved toward each other and secured to effectively grip said crank arms, whereby the devices are rigidly held in place.

Since probably the best results are obtained from the several specific details shown and described, these details will preferably be employed, but I wish it understood that within the scope of the invention as claimed, numerous minor changes may well be made.

I claim:—

1. A crank shaft counterbalance comprising a weight adapted to be positioned at one end of a crank arm, said weight being formed of two sections hinged together, arms extending one from each of said sections for straddling and gripping the crank arm, and means for securing said arms in place when applied.

2. A crank shaft counterbalance comprising a weight adapted to be positioned at one end of a crank arm, and a pair of arms extending in the same direction from said weight and adapted to straddle the crank arm, said arms being movable toward and away from each other and the inner sides of said arms having seats to receive the edges of the crank arm; together with means for preventing spreading of said arms after application of the device to the shaft.

3. A structure as specified in claim 2, said seats comprising longitudinal channels in said arms decreasing in depth toward their ends.

4. A crank shaft counterbalance comprising a weight adapted to be positioned at one end of a crank arm, said weight being formed of two sections hinged together, a pair of arms extending one from each of said sections, and rigidly joined thereto, said arms being adapted to straddle the crank arm and having seats at their inner sides to receive the edges of said arm; together with means for preventing spreading of said arms after application of the device to the shaft.

5. A structure as specified in claim 4, said seats comprising channels in said arms decreasing in depth toward their ends.

6. A structure as specified in claim 2, said means comprising apertured ears on said arms and a bolt passing through said ears.

7. A structure as specified in claim 2, said seats comprising channels in said arms decreasing in depth toward their ends, and said means comprising apertured ears on said arms and a bolt passing through said ears.

8. A structure as specified in claim 1, said means comprising a bolt for drawing the two sections of said weight together to clamp said arms against the crank arm.

In testimony whereof I have hereunto set my hand in the presence of two subscribing witnesses.

WILLIAM G. DUNN.

Witnesses:
R. E. SEIFERT,
DAVID THARP.